(12) United States Patent
Ohtake

(10) Patent No.: US 9,338,844 B2
(45) Date of Patent: May 10, 2016

(54) LED LIGHTING APPARATUS

(71) Applicant: Sanken Electric Co., Ltd., Niiza-shi, Saitama (JP)

(72) Inventor: Osamu Ohtake, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 14/627,061

(22) Filed: Feb. 20, 2015

(65) Prior Publication Data

US 2015/0245432 A1 Aug. 27, 2015

(30) Foreign Application Priority Data

Feb. 21, 2014 (JP) ................. 2014-031356

(51) Int. Cl.
*H05B 33/08* (2006.01)
(52) U.S. Cl.
CPC ........ *H05B 33/0815* (2013.01); *H05B 33/0845* (2013.01)
(58) Field of Classification Search
CPC .................. H05B 33/0815; H05B 33/0845
USPC ........................................................ 315/224
See application file for complete search history.

(56) References Cited

U.S. PATENT DOCUMENTS

| 2002/0158590 A1* | 10/2002 | Saito | H05B 33/0809 |
| | | | 315/291 |
| 2006/0170373 A1* | 8/2006 | Yang | H05B 33/0815 |
| | | | 315/209 R |
| 2010/0111123 A1* | 5/2010 | Fujimura | H01S 5/042 |
| | | | 372/38.07 |
| 2012/0019714 A1* | 1/2012 | Hiramatu | H05B 3/0815 |
| | | | 348/370 |
| 2012/0194090 A1* | 8/2012 | Esaki | H02M 3/156 |
| | | | 315/200 R |
| 2012/0262080 A1* | 10/2012 | Watanabe | H05B 33/0818 |
| | | | 315/210 |
| 2014/0077719 A1* | 3/2014 | Fukuda | H05B 33/08 |
| | | | 315/224 |
| 2015/0035446 A1* | 2/2015 | Yamahara | H05B 33/0818 |
| | | | 315/210 |
| 2015/0245432 A1* | 8/2015 | Ohtake | H05B 33/0845 |
| | | | 315/224 |

FOREIGN PATENT DOCUMENTS

JP  2011-210659 A  10/2011

* cited by examiner

*Primary Examiner* — Dylan White
(74) *Attorney, Agent, or Firm* — Mots Law, PLLC

(57) ABSTRACT

An LED lighting apparatus includes (i) a series circuit connected to both ends of the DC power source and including an LED, an inductor L1, a switching element Q1, and a current detecting resistor R1, (ii) a regenerative diode D1 connected in parallel with a series circuit of the LED and inductor L1, and (iii) a PWM control circuit 11 carrying out ON/OFF control of the switching element. The capacitor C2 is charged and discharged according to a differential current between a current of the switching element when the switching element is ON and a predetermined constant current, and the PWM control circuit 11 carries out PWM control based on a voltage of the capacitor C2 to keep a current average value in each ON period of the switching element to control a constant current of the LED.

3 Claims, 5 Drawing Sheets

LED LIGHTING APPARATUS

BACKGROUND OF THE INVENTION

1. Field of the Invention

The present invention relates to an LED lighting apparatus to turn on an LED.

2. Description of Related Art

A related art concerning an LED lighting apparatus for turning on an LED (Light Emitting Diode) is, for example, Japanese Unexamined Patent Application Publication No. 2011-210659 (Patent Literature 1). The LED lighting apparatus of this related art turns on and controls the LED with direct current.

The LED lighting apparatus of the related art includes a step-down chopper circuit. The step-down chopper circuit includes the LED that is turned on with direct current, an inductor and a switching element that are connected in series with the LED, and a regenerative diode that is connected in parallel with a series circuit of the LED and inductor. The regenerative diode is oriented in a direction to discharge accumulated energy of the inductor to the LED when the switching element is OFF. The LED lighting apparatus also includes a control circuit to turn on/off the switching element.

The control circuit includes a unit to turn off the switching element when an instantaneous value of an incremental current passing through the inductor during an ON time of the switching element reaches a predetermined value and a unit to turn on the switching element when a decremental current passing through the inductor reaches nearly zero during an OFF time of the switching element.

SUMMARY OF THE INVENTION

The LED lighting apparatus of the related art turns on the switching element when a decremental current passing to the inductor reaches nearly zero during an OFF time of the switching element, to realize average current control. This control of the related art, however, is conducted in a critical mode, and therefore, a peak value of the current passing through the inductor is large to increase a loss at the time of turning off the switching element.

If input voltage fluctuations occur on the related art, the timing of turning on the switching element will fluctuate to change an oscillation frequency and a switching loss.

To fix the peak value of the current passing through the switching element, PWM (Pulse Width Modulation) control may be useful. The PWM control, however, has a problem that it is unable to conduct the average current control if input voltage fluctuations occur.

The LED lighting apparatus for turning on an LED generally uses a constant current to conduct control actions. An LED lighting apparatus that conducts the PWM control with a step-down LED driving circuit floats (isolates) the LED. For such an LED driving circuit, a current detecting unit is unable to carry out a low-side (ground-side) current detection of a current of the LED. To detect an average current, the current detecting circuit must be floated to directly detect the current of the LED.

The floated current detecting circuit requires a high withstand voltage between the current detecting circuit and a control circuit. This needs a signal isolating circuit such as a photocoupler and high-withstand-voltage parts, thereby increasing the cost of the LED lighting apparatus.

The present invention provides an LED lighting apparatus that is able to conduct the average current control without regard to input voltage fluctuations, is simple in structure, and is inexpensive.

According to an aspect of the present invention, the LED lighting apparatus includes a DC power source, a series circuit connected to both ends of the DC power source and including an LED, an inductor, a switching element, and a current detecting resistor, a regenerative diode connected in parallel with a series circuit of the LED and inductor, a capacitor to be charged and discharged according to a differential current between a current of the switching element when the switching element is ON and a predetermined constant current, and a PWM control circuit that carries out ON/OFF control of the switching element and PWM control based on a voltage of the capacitor to keep a current average value in each ON period of the switching element constant.

DESCRIPTION OF PREFERRED EMBODIMENTS

LED lighting apparatuses according to embodiments of the present invention will be explained in detail with reference to the drawings.

Embodiment 1

Figure 1:
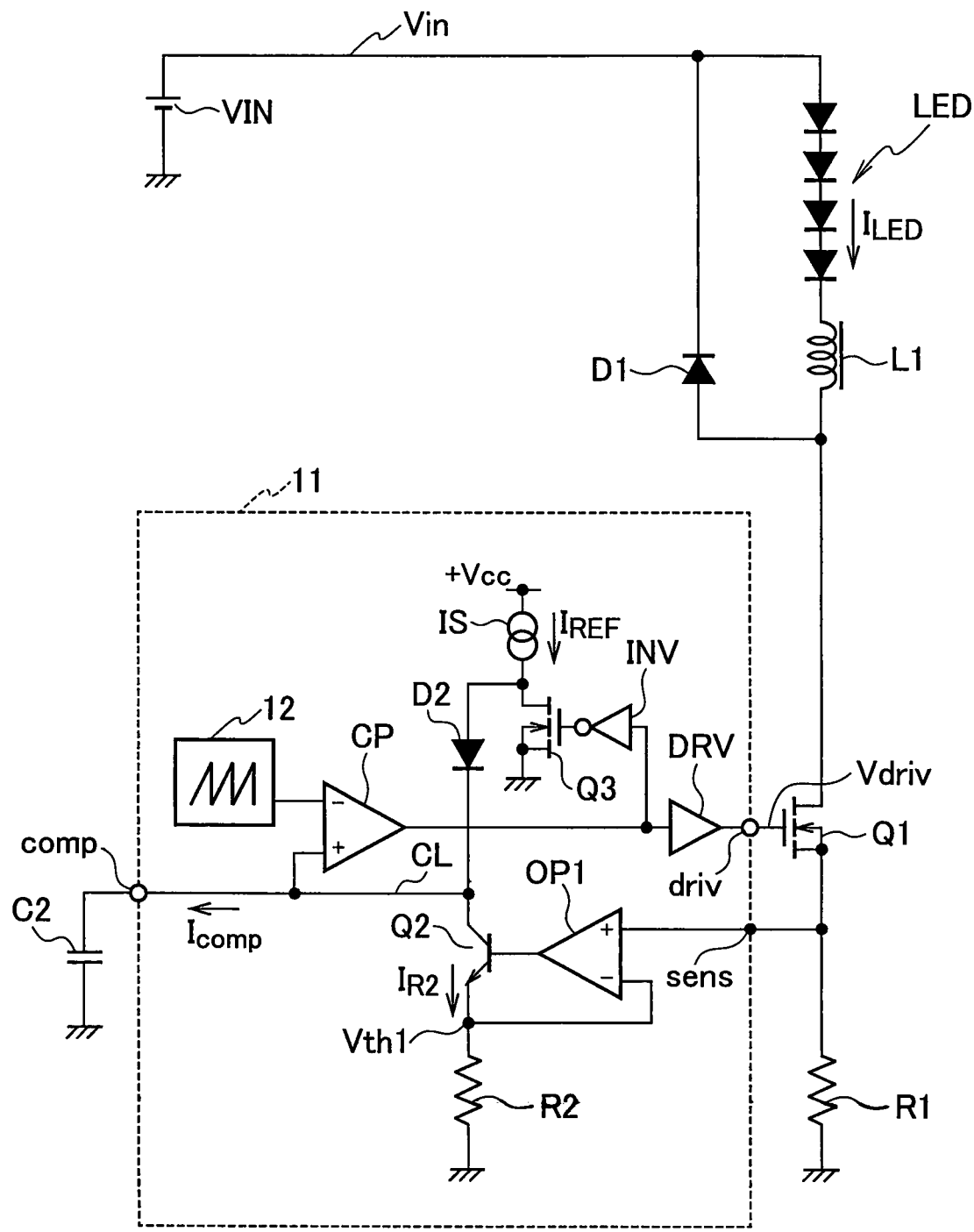
FIG. 1 is a circuit diagram illustrating an LED lighting apparatus according to Embodiment 1 of the present invention.

FIG. 1 is a circuit diagram illustrating an LED lighting apparatus according to Embodiment 1 of the present invention. This apparatus includes a DC power source VIN that has a grounded negative electrode and generates a voltage Vin, a group of LEDs that has an anode connected to a positive electrode of the DC power source VIN and emits light when a current ILED is passed thereto, an inductor L1 having a first end connected to a cathode of the LED group, a switching element Q1 having a drain connected to a second end of the inductor L1, and a current detecting resistor R1 having a first end connected to a source of the switching element Q1 and a second end connected to the ground.

A series circuit of the LED group and inductor L1 is connected in parallel with a regenerative diode D1 that is oriented in a direction to discharge accumulated energy of the inductor L1 to the LED group when the switching element Q1 is OFF.

A gate of the switching element Q1 is connected to a terminal "driv" of a PWM control circuit 11 that controls ON/OFF of the switching element Q1. A terminal "sens" of the PWM control circuit 11 is connected to the source of the switching element Q1 and the current detecting resistor R1. A terminal "comp" of the PWM control circuit 11 is connected to a first end of a phase correcting capacitor C2. A second end of the capacitor C2 is grounded.

The PWM control circuit 11 includes an operational amplifier OP1 for detecting a current, a resistor R2, a switching element Q2, a triangular signal generator 12, a comparator CP, a driver DRV, an inverter INV, a switching element Q3, a constant current source IS for outputting a reference current IREF, and a diode D2.

The PWM control circuit 11 conducts ON/OFF control of the switching element Q1 and PWM control that equalizes a current average value in every ON period of the switching element Q1 according to a voltage of the capacitor C2, thereby keeping the current passing through the LED group constant.

The constant current source IS, switching element Q3, inverter INV, and diode D2 form a constant current source.

The operational amplifier OP1 has a non-inverting input terminal "+" connected through the terminal "sens" to the source of the switching element Q1 and the current detecting resistor R1. An inverting input terminal "−" of the operational amplifier OP1 is connected to a first end of the resistor R2 and an emitter of the switching element Q2. A second end of the resistor R2 is grounded. An output terminal of the operational amplifier OP1 is connected to a base of the switching element Q2. A collector of the switching element Q2 is connected to a common line CL that connects a cathode of the diode D2, a non-inverting input terminal of the comparator CP, and the terminal "comp" to one another.

The terminal "comp" is connected to a first end of the capacitor C2. A second end of the capacitor C2 is grounded. The terminal "comp" passes a control current Icomp to charge and discharge the capacitor C2. Namely, the capacitor C2 is charged and discharged with the control current Icomp that is a differential current between a current IR2 passing through the resistor R2 when the switching element Q1 is ON and the reference current IREF that is a predetermined constant current.

The triangular signal generator 12 generates a triangular signal and supplies the same to an inverting input terminal of the comparator CP. The comparator CP compares the triangular signal from the triangular signal generator 12 with a control voltage Vcomp from the terminal "comp" and outputs a comparison output signal to the driver DRV. The driver DRV outputs a voltage Vdriv as a PWM signal through the terminal "driv" to the gate of the switching element Q1.

The inverter INV inverts the output of the comparator CP and applies the inverted output to a gate of the switching element Q3. A drain of the switching element Q3 is connected to the constant current source IS and an anode of the diode D2. A source of the switching element Q3 is grounded. The cathode of the diode D2 is connected to the common line CL.

In the PWM control circuit 11, the switching element Q3 turns off when the output of the comparator CP becomes high level, to pass the reference current IREF of the constant current source IS through the diode D2 to the common line CL. When the output of the comparator CP becomes low level, the switching element Q3 turns on to pass the reference current IREF to the ground, and therefore, no current passes through the diode D2 to the common line CL.

Figure 2:
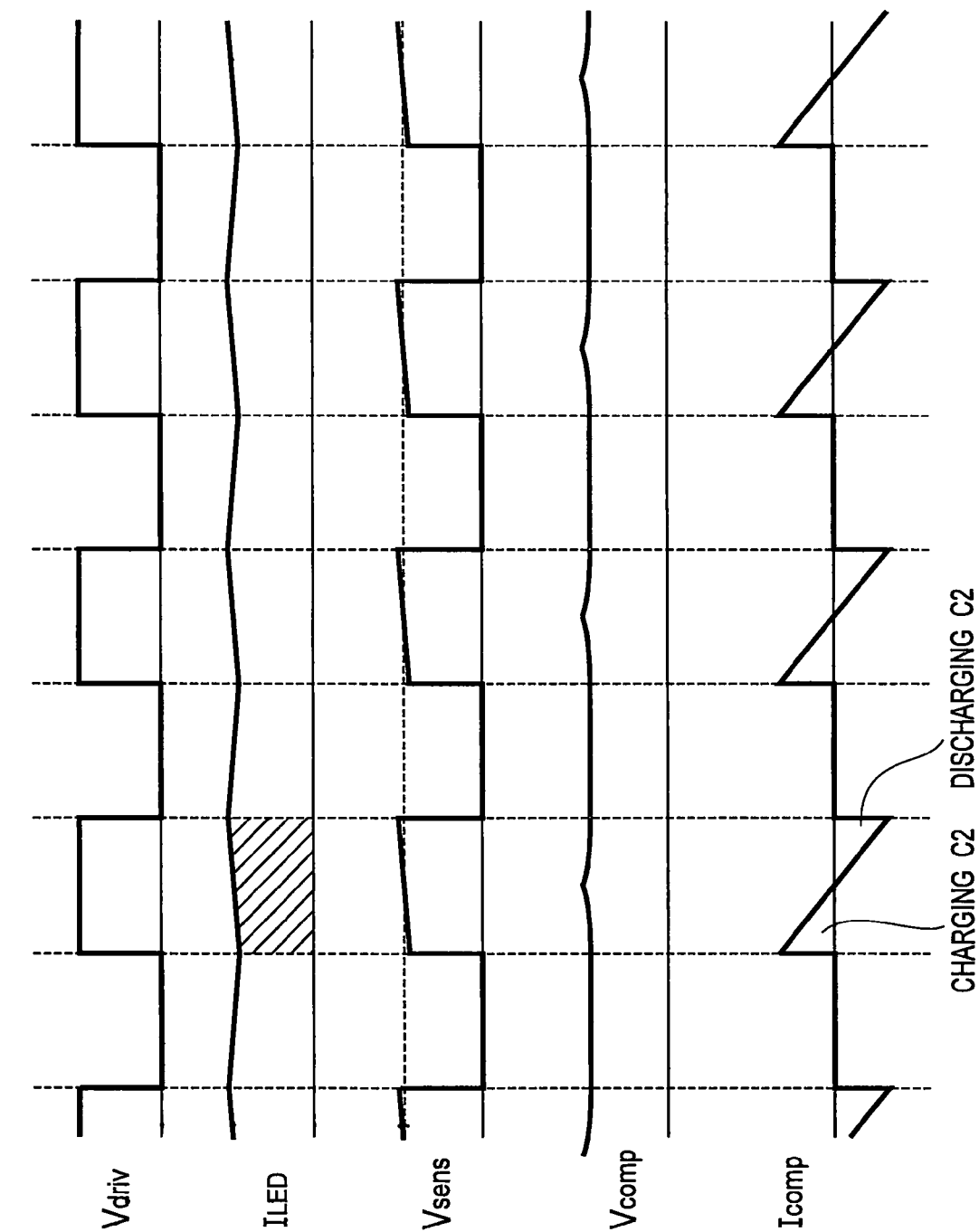
FIG. 2 is a timing chart explaining operation of the LED lighting apparatus according to Embodiment 1.

Operation of the LED lighting apparatus according to Embodiment 1 will be explained with reference to the timing chart of FIG. 2.

During a period in which the voltage Vdriv outputted from the terminal "driv" of the PWM control circuit 11 is high, i.e., during an ON period of the switching element Q1, the DC power source VIN passes a current through the LED group, inductor L1, switching element Q1, and current detecting resistor R1 to the ground.

At this time, a voltage generated by the current detecting resistor R1 is supplied through the terminal "sens" to the non-inverting input terminal of the operational amplifier OP1. The inverting input terminal of the operational amplifier OP1 is connected to the resistor R2 that causes a voltage drop Vth1. The operational amplifier OP1 controls the switching element Q2 and provides the current IR2 to the resistor R2 to equalize the voltage drop Vth1 with the voltage generated by the current detecting resistor R1. A differential current between the current IR2 of the collector of the switching element Q2 and the reference current IREF provided by the constant current source IS is sent as the control current Icomp to the terminal "comp".

According to the control current Icomp, the capacitor C2 connected to the terminal "comp" is charged and discharged. More precisely, the capacitor C2 is charged with the control current Icomp in a first half of the high-level period of the voltage Vdriv and is discharged with the control current Icomp in a second half thereof. To realize constant current control, the control voltage Vcomp at the terminal "comp" is inputted to the PWM control circuit 11 that controls the duty of the PWM signal to be outputted from the terminal "driv".

When the output of the driver DRV is high, the switching element Q3 connected to a node between the constant current source IS and the anode of the diode D2 becomes OFF. Accordingly, the reference current IREF driven by the constant current source IS passes through the diode D2 to the terminal "comp" and the collector of the switching element Q2. At this time, the current IR2 passes through the switching element Q2 connected to the output terminal of the current detecting operational amplifier OP1. As a result, the control current Icomp passing through the terminal "comp" becomes equal to the difference between the reference current IREF and the current IR2. According to the control current Icomp, the capacitor C2 is charged and discharged (subtractive operation).

If a current passing through the inductor L1 is in a continuous mode, a current passing in a period in which the inductor L1 accumulates energy is detected to collectively average a current passing in an OFF period of the switching element Q1 in which the accumulated energy of the inductor L1 is discharged.

Figure 3:
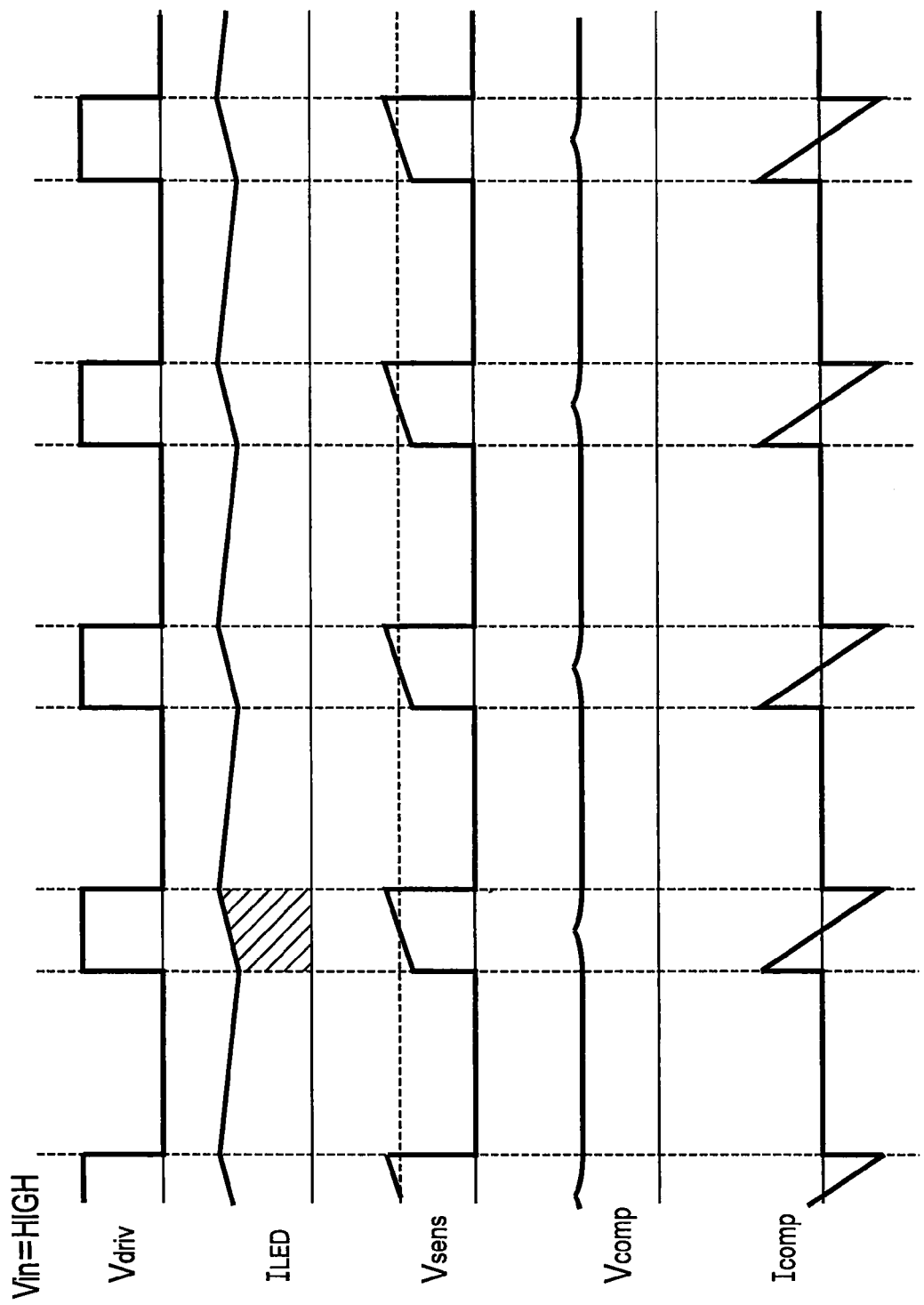
FIG. 3 is a timing chart illustrating operation of the LED lighting apparatus according to Embodiment 1 with an increased input voltage.

FIG. 3 is a timing chart illustrating operation of the LED lighting apparatus according to the present embodiment when the input voltage Vin increases due to voltage fluctuations in the DC power source VIN. If the input voltage Vin decreases due to voltage fluctuations in the DC power source VIN, the PWM control circuit 11 extends an ON width of the PWM signal outputted as the voltage Vdriv from the terminal "driv" as illustrated in FIG. 2.

If the input voltage Vin increases due to voltage fluctuations in the DC power source VIN, the PWM control circuit 11 shortens the ON width of the PWM signal outputted as the voltage Vdriv from the terminal "driv" as illustrated in FIG. 3. In each case, the period of the PWM signal is unchanged. This control makes the current ILED passing through the LED group constant without regard to changes in the input voltage Vin caused by voltage fluctuations in the DC power source VIN.

In this way, the LED lighting apparatus according to Embodiment 1 is capable of avoiding the problems of the related arts such as a loss caused at the time of switching off and a switching loss caused by oscillation frequency fluctuations due to input voltage fluctuations. The LED lighting apparatus of Embodiment 1 charges and discharges the capacitor C2 with a differential current between a current passing when the switching element Q1 is ON and a predetermined constant current. According to the voltage of the capacitor C2, the PWM control circuit 11 of Embodiment 1 carries out PWM control to equalize a current average in every ON period of the switching element Q1, thereby passing a constant current through the LED group. Namely, the LED lighting apparatus of Embodiment 1 is capable of conducting the average current control according to the PWM control without regard to input voltage fluctuations.

The LED lighting apparatus according to Embodiment 1 connects the LEDs as load between the DC power source VIN and the switching element Q1 serving as a driver and employs a low-side control system to control the current of the DC power source VIN passing through the load to the driver. Since Embodiment 1 detects a current passing through the LEDs on the low side, the LED lighting apparatus of Embodiment 1 is capable of simplifying the circuitry thereof and employing inexpensive parts, thereby making the apparatus simple and inexpensive.

Embodiment 2

Figure 4:
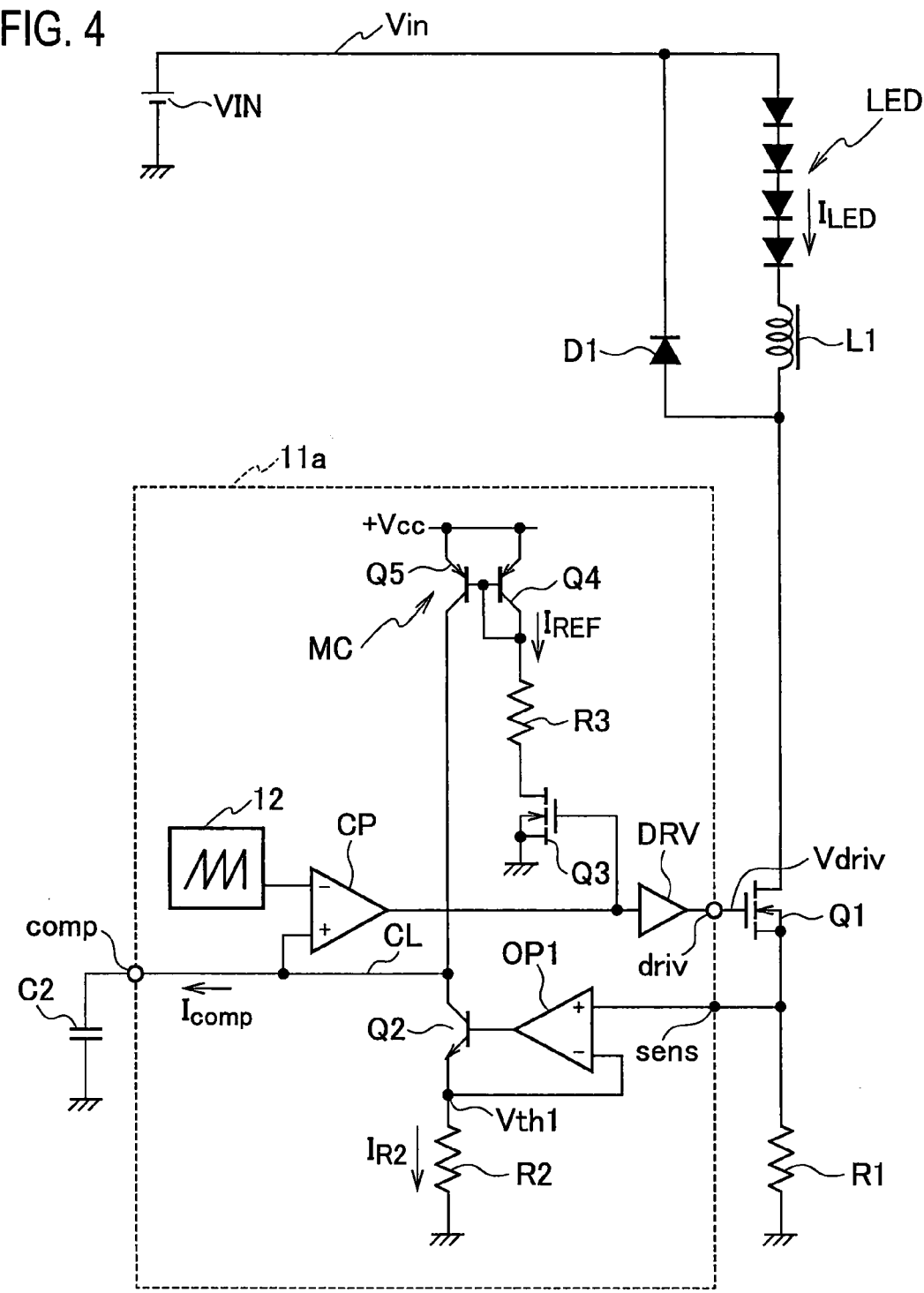
FIG. 4 is a circuit diagram illustrating an LED lighting apparatus according to Embodiment 2 of the present invention.

FIG. 4 is a circuit diagram illustrating an LED lighting apparatus according to Embodiment 2 of the present invention. The LED lighting apparatus of Embodiment 2 employs a PWM control circuit 11a that differs from the PWM control circuit 11 of Embodiment 1. The PWM control circuit 11a of Embodiment 2 eliminates the inverter INV, constant current source IS, and diode D2 of Embodiment 1 and employs a resistor R3 and a current mirror circuit MC.

The current mirror circuit MC includes two transistors Q4 and Q5 in which the transistor Q5 drives a current that is equivalent to a current passing through the transistor Q4.

A comparator CP has an output terminal connected to a gate of a switching element Q3. The switching element Q3 has a source connected to the ground and a drain connected through the resistor R3 to the current mirror circuit MC, i.e., to the collector and base of the transistor Q4 and the base of the transistor Q5. The collector of the transistor Q5 is connected to a common line CL. Emitters of the transistors Q4 and Q5 are connected to a power source +Vcc.

In the PWM control circuit 11a, the switching element Q3 turns on when the output of the comparator CP becomes high, to pass a reference current IREF through the transistor Q4 of the current mirror circuit MC, the resistor R3, and the switching element Q3. As a result, a current equal to the reference current IREF passes through the transistor Q5 of the current mirror circuit MC.

When the output of the comparator CP becomes low, the switching element Q3 turns off to block the reference current IREF. Accordingly, no current passes through the current mirror circuit MC to the common line CL. In this way, the PWM control circuit 11a of Embodiment 2 operates like the PWM control circuit 11 of Embodiment 1.

Since the PWM control circuit 11a of Embodiment 2 operates like the PWM control circuit 11 of Embodiment 1, the LED lighting apparatus according to Embodiment 2 provides effects similar to those provided by Embodiment 1.

Embodiment 3

Figure 5:
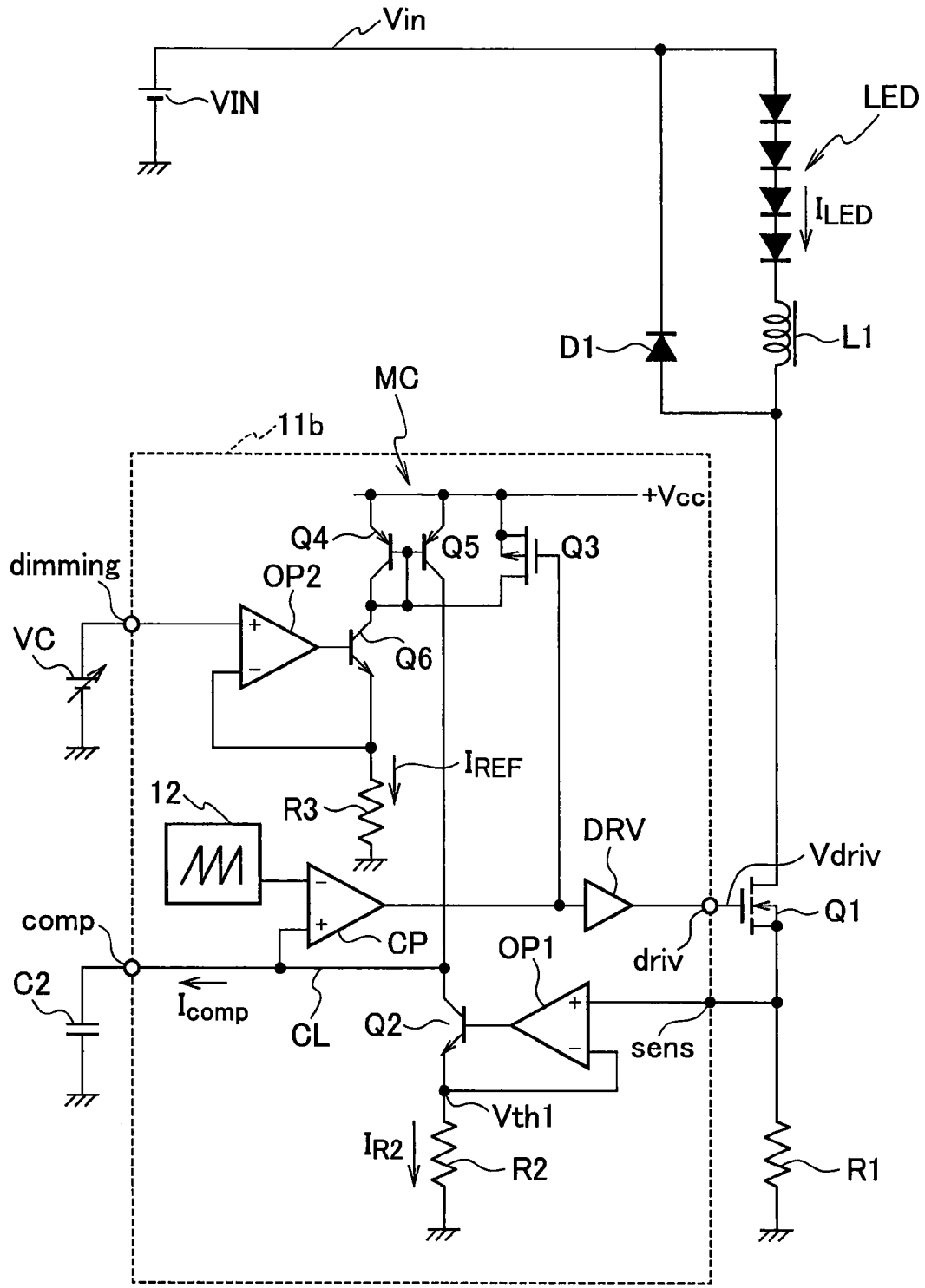
FIG. 5 is a circuit diagram illustrating an LED lighting apparatus according to Embodiment 3 of the present invention.

FIG. 5 is a circuit diagram illustrating an LED lighting apparatus according to Embodiment 3. The LED lighting apparatus of Embodiment 3 additionally arranges a variable DC power source VC and employs a PWM control circuit 11b that differs from the PWM control circuit 11 of Embodiment 1.

The PWM control circuit 11b of Embodiment 3 eliminates the inverter INV, constant current source IS, and diode D2 of Embodiment 1 and employs a resistor R3, a switching element Q6, a current mirror circuit MC, an operational amplifier OP2, and a terminal "dimming".

A constant current generating circuit of the LED lighting apparatus according to Embodiment 3 includes a p-type MOSFET Q3, the resistor R3, the switching element Q6, the current mirror circuit MC, and the operational amplifier OP2.

A comparator CP has an output terminal connected to a gate of the MOSFET Q3. The MOSFET Q3 has a source connected to a power source +Vcc and a drain connected to the current mirror circuit MC, more precisely, to the collector and base of a transistor Q4 and the base of a transistor Q5.

The transistor Q5 of the current mirror circuit MC is connected to a common line CL. The base of the switching element Q6 is connected to the output terminal of the operational amplifier OP2. The operational amplifier OP2 has an inverting input terminal connected to a node between the emitter of the switching element Q6 and the resistor R3 and a non-inverting input terminal connected through the terminal "dimming" to the variable DC power source VC. The variable DC power source VC outputs to the terminal "dimming" a variable DC voltage as a dimming signal to adjust the light output of a group of LEDs.

In the LED lighting apparatus according to the present embodiment, the dimming signal is supplied to the terminal "dimming". If a voltage Vdriv at the gate of a switching element Q1 is high at this time, the MOSFET Q3 turns off to pass a reference current TREF corresponding to the voltage of the dimming signal to the transistor Q4 of the current mirror circuit MC through a voltage-current converting circuit that includes the operational amplifier OP2, switching element Q6, and resistor R3. As a result, a current equal to the reference current TREF passes from the transistor Q5 of the current mirror circuit MC to the common line CL.

At the same time, the switching element Q1 passes a drain current and the current passing through the switching element Q1 is inputted through a current detecting resistor R1 to a terminal "sens". As a result, a differential current between a current passing through a voltage-current converting circuit including an operational amplifier OP1, a switching element Q2, and a resistor R2 and the current driven by the current mirror circuit MC is outputted as a control current Icomp to a terminal "comp".

The terminal "comp" is connected to a phase correcting capacitor C2 that is charged and discharged with the control current Icomp. Constant current control is carried out simultaneously with the dimming control by applying a current at the terminal "comp" to the PWM control circuit 11b and by controlling the duty of a PWM signal outputted from the terminal "driv".

In this way, the LED lighting apparatus of Embodiment 3 operates like that of Embodiment 1 and provides effects similar to those provided by Embodiment 1. In addition, the LED lighting apparatus of Embodiment 3 is capable of conducting the dimming control.

As mentioned above, the LED lighting apparatus according to the present invention charges and discharges a capacitor according to a differential current between a current passing when a switching element is ON and a predetermined constant current and a PWM control circuit conducts PWM control according to a voltage of the capacitor, to equalize a current average value in every ON period of the switching element, thereby keeping a current of LEDs constant. The LED lighting apparatus of the present invention is capable of carrying out the current averaging control even if input voltage fluctuates. Also, the LED lighting apparatus of the present invention is simple in structure and inexpensive.

The present invention is applicable to lighting equipment, illumination systems, and the like that employ LEDs.

This application claims benefit of priority under 35 USC §119 to Japanese Patent Application No. 2014-031356, filed on Feb. 21, 2014, the entire contents of which are incorporated by reference herein.

What is claimed is:

1. An LED lighting apparatus comprising:
 a DC power source;
 a series circuit connected to both ends of the DC power source and including an LED, an inductor, a switching element, and a current detecting resistor;
 a regenerative diode connected in parallel with a series circuit of the LED and inductor;
 a capacitor for charging and discharging according to a differential current between a current passing through the switching element when the switching element is ON and a predetermined constant current; and
 a PWM control circuit that carrying out ON/OFF control of the switching element and PWM control based on a voltage of the capacitor to keep a current average value in each ON period of the switching element constant.

2. The LED lighting apparatus of claim 1, wherein the PWM control circuit includes:
 an operational amplifier connected to the current detecting resistor;
 a constant current source connected to a common line that connects an output of the operational amplifier and the capacitor to each other, the constant current source generating the constant current so that the constant current turns on and off in synchronization with the switching element;
 a triangular signal generator generating a triangular signal; and
 a comparator comparing a voltage of the common line with the triangular signal from the triangular signal generator and generating a PWM signal for the PWM control.

3. The LED lighting apparatus of claim 2, further comprising a variable DC power source generating a dimming signal used to adjust light output, wherein the constant current source adjusts a current passing through the common line according to the dimming signal of the variable DC power source.

* * * * *